(12) United States Patent
He

(10) Patent No.: US 8,184,020 B2
(45) Date of Patent: May 22, 2012

(54) METHOD AND SYSTEM DISPLAYING A FLIGHT PATH TO INTERCEPT AN ILS GLIDE PATH

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 425 days.

(21) Appl. No.: 12/511,826

(22) Filed: Jul. 29, 2009

(65) Prior Publication Data

US 2011/0025530 A1 Feb. 3, 2011

(51) Int. Cl.
*G01C 21/00* (2006.01)
(52) U.S. Cl. .......... 340/976; 340/973; 340/979; 701/14; 701/16; 701/17
(58) Field of Classification Search .......... 340/972–980; 701/4, 14, 16, 17
See application file for complete search history.

(56) References Cited

U.S. PATENT DOCUMENTS

| | | | |
|---|---|---|---|
| 4,368,517 A | 1/1983 | Lovering | |
| 5,289,185 A * | 2/1994 | Ramier et al. | 340/971 |
| 5,798,713 A | 8/1998 | Viebahn et al. | |
| 6,317,059 B1 * | 11/2001 | Purpus et al. | 340/974 |
| 6,889,124 B2 * | 5/2005 | Block et al. | 701/9 |
| 7,075,457 B1 | 7/2006 | Chidester et al. | |
| 7,295,901 B1 | 11/2007 | Little et al. | |
| 7,508,322 B1 * | 3/2009 | Krenz et al. | 340/976 |
| 7,522,977 B2 * | 4/2009 | Foucart et al. | 701/16 |
| 2002/0099528 A1 | 7/2002 | Hett | |
| 2004/0015274 A1 * | 1/2004 | Wilkins et al. | 701/3 |
| 2007/0106433 A1 * | 5/2007 | He | 701/16 |

FOREIGN PATENT DOCUMENTS

| | | |
|---|---|---|
| EP | 1835260 A1 | 9/2007 |
| WO | 9711335 A1 | 3/1997 |
| WO | 2006107749 A1 | 10/2006 |

OTHER PUBLICATIONS

EP Search Report, EP 10170357.7-1236 dated Nov. 18, 2010.

* cited by examiner

*Primary Examiner* — Brent Swarthout
(74) *Attorney, Agent, or Firm* — Ingrassia Fisher & Lorenz, P.C.

(57) ABSTRACT

A method displaying a pathway (226, 502) for an aircraft includes receiving (302, 402, 602) an instrument generated course generally in alignment with a runway centerline (214), determining (304, 404, 604) the pathway (226, 502) based on aircraft flight parameters in which the aircraft may fly in order to intersect the instrument generated course, rendering (306, 406, 606) on a display the instrument generated course and the pathway; and periodically repeating (308, 408, 608) the determining and rendering steps. The energy state of the aircraft may be considered in determining the pathway and optional indices (508) may be displayed indicating deviation from the pathway centerline.

17 Claims, 7 Drawing Sheets

US 8,184,020 B2

METHOD AND SYSTEM DISPLAYING A FLIGHT PATH TO INTERCEPT AN ILS GLIDE PATH

FIELD OF THE INVENTION

The present invention generally relates to aircraft navigation instrumentation and more particularly to a method for displaying a representation of the flight path necessary to intercept an instrument or visual approach path.

BACKGROUND OF THE INVENTION

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits (vertical). An approach outside of this envelope can result in an undesirable positioning of the aircraft with respect to the runway, resulting in possibly discontinuance of the landing attempt.

In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments during the approach to some extent. Many airports and aircraft include instrument landing systems (ILS) to help guide aircraft during approach and landing operations. These systems allow for the display of a lateral deviation indicator to indicate aircraft lateral deviation from the approach course, and the display of a glide slope indicator to indicate vertical deviation from the glide slope.

Typical instrumentation of an aircraft primary flight display shows the heading by an arrow pointing on a compass and may include an aircraft symbol pointing in the direction in which the aircraft is going. The aircraft symbol may be displayed relative to a geometric symbol or set of symbols, to indicate whether the aircraft is left or right of the desired course and above, below, or on the desired glide slope.

Although these known aircraft systems, including those described immediately above, are generally safe, reliable, and robust, these systems do suffer certain drawbacks. When pilots fly course intercept in VFR/IFR conditions, it is often difficult to judge the path in three dimension space to properly intercept the course line due to the aircraft being at an altitude above the ground course line to the target runway. For example, when turning onto a runway centerline for final approach in typical GPS approaches, aircraft may overshoot or undershoot the runway centerline. This is more of an issue in IMC conditions when the runway is not in sight. For an ILS approach course capture, the interval from ILS deviation becoming valid to the capture of beam center is relatively short due to narrower beam width which can lead to overshoot or less desirable turn maneuvers. Given the trend of tighter path management for increased capacity, particularly within terminal airspace, it is desirable to provide an intuitive intercept pathway display that is compatible with aircraft parameters for proper course line intercept.

Accordingly, it is desirable to provide an aircraft navigation instrumentation system and more particularly to displaying a flight path for intercepting an instrument approach path. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method displaying a pathway for an aircraft includes receiving an instrument generated course generally in alignment with a runway, determining the pathway based on aircraft flight parameters in which the aircraft may fly in order to intersect the instrument generated course, rendering on a display the instrument generated course and the pathway; and periodically repeating the determining and rendering steps. The energy state of the aircraft may be considered in determining the pathway and optional indices may be displayed indicating deviation from the pathway.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
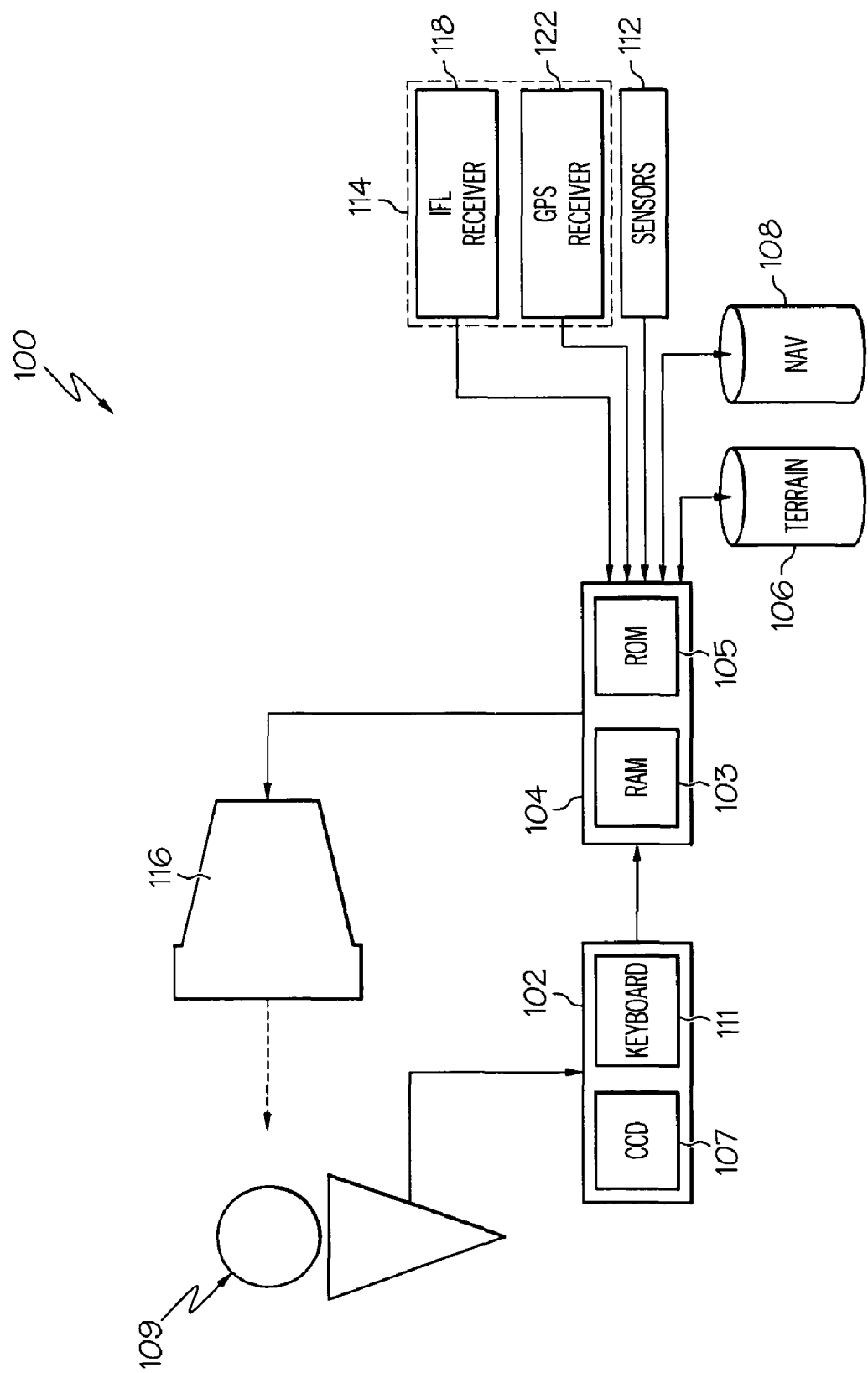
FIG. 1 is a functional block diagram of a flight display system that may be used with the exemplary embodiments.

The following detailed description of the invention is merely exemplary in nature and is not intended to limit the invention or the application and uses of the invention. Furthermore, there is no intention to be bound by any theory presented in the preceding background of the invention or the following detailed description of the invention.

A pathway with short term deviation ahead information is displayed based on aircraft parameters, flight management system parameters, and landing target or intercept course parameters such as direct distance to the course, distance to the destination, and maximum allowed deviation from the course. This graphic representation of a predicted aircraft energy state for approaching a runway is beneficial to flight crews for safe operation of an aircraft in approach and landing operations. In general, an approach will follow a path given by flight management system flight plans. When performing final approach to a runway, the aircraft is aligned with the approach course for the runway. These final approach modes are often displayed as the conformal lateral deviation format with an approach course line to the approach point. The predicted aircraft energy state can therefore be encoded into these conformal representation lines to provide predicted energy state for the aircraft.

A display system provides a computed pathway based on current aircraft parameters and positions relative to the intended course line. The pathway for the aircraft to follow is modified periodically in real time based on updated aircraft parameters. The intended course line may be, for example, a runway centerline or an instrument generated track. The course line may contain straight and/or curved segments that are compatible with the aircraft performance setting and other determining factors such as passenger comfort and maximum allowed deviation from certain constraints. The constraints may be, for example, a minimum or maximum airspeed or altitude, direct distance to the course, distance to the destination, and maximum allowed deviation from the course. The pathway may show in another exemplary embodiment the short term aircraft movement trend along the desired pathway in the form of a trend deviation scale on the pathway. The pathway is adaptively regenerated when the current flight profile of the aircraft deviates from the initial pathway exceeds a predetermined limit due to various conditions. The system also may provide in yet another exemplary embodiment an awareness/caution symbol if the current aircraft energy state does not allow a proper intercept.

When flight crews have an intuitive view of the predicted energy state relative to the approaching target, they can visualize clearly if the current speed or altitude is too high for a safe approach. For example, when the section of the conformal approach course line near the runway is encoded as caution or warning color, it is an indication of overspeed. The flight crews can therefore make an adjustment. Likewise, the predicted energy state ahead can also be encoded onto the flight management system flight plan curves or vectors representations for the terminal approach procedures. Here, the predicted energy state is computed independently of flight management system flight plan path and is then projected onto the flight management system flight plan path for visualization in both two dimension and three dimension representations. The current aircraft energy state relative to the approach target for the intended pathway is computed, either following the flight management system path or final approach directions. The computed energy state is then projected onto the flight management system path or the final approach course line for visualization on both three dimension perspective view and two dimension map applications.

Although the examples of embodiments in this specification are described in terms of the currently widely used ILS, embodiments of the present invention are not limited to applications of airports utilizing ILS. To the contrary, embodiments of the present invention are applicable to any runway utilizing a runway assistance landing system (of which ILS is an example) that transmits a signal to aircraft indicating an approach line to a runway. Alternate embodiments of the present invention to those described below may utilize whatever runway assistance landing system signals are available, for example a ground based navigational system, a GPS navigation aid, a flight management system, and an inertial navigation system, to dynamically calibrate and determine a precise approach course to a runway and display the approach course relative to the runway centerline direction to pilots.

Referring to FIG. 1, an exemplary flight deck display system is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an instrument landing system (ILS) receiver 118 and a global position system (GPS) receiver 122 are depicted in FIG. 1, and will now be briefly described.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
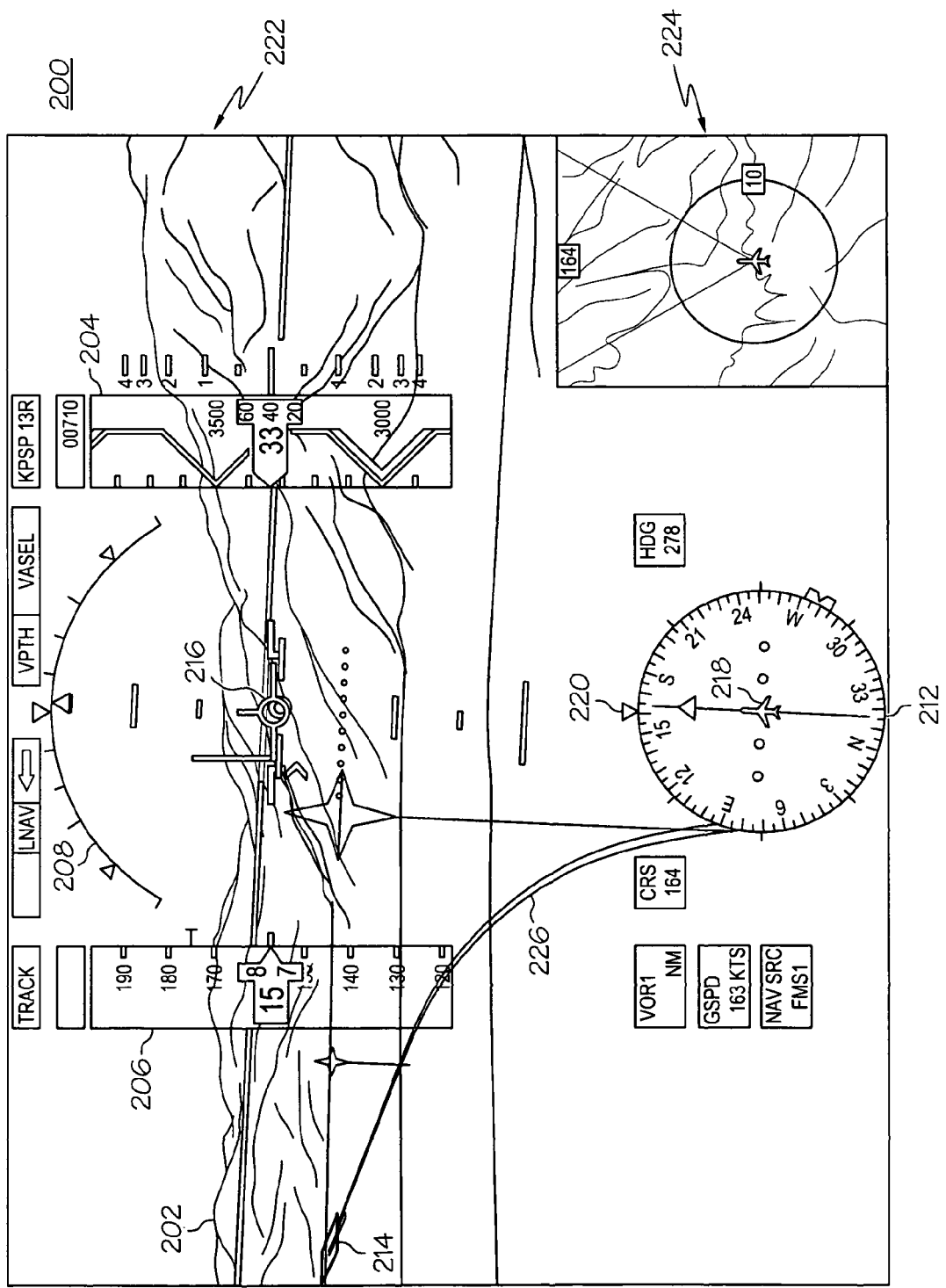
FIG. 2 is an image of a first exemplary embodiment that may be rendered on the flight display system of FIG. 1.

Referring to FIG. 2, exemplary textual, graphical, and/or iconic information of a first exemplary embodiment rendered by the display device 116, in response to appropriate display commands from the processor 104 is depicted. It is seen that the display device 116 renders a view of the terrain 202 ahead of the aircraft, preferably as a three-dimensional perspective view 222, an altitude indicator 204, an airspeed indicator 206, an attitude indicator 208, a compass 212, an extended runway centerline 214, and a flight path vector indicator 216. A top down view 224 may optionally be provided. The heading indicator 212 includes an aircraft icon 218, and a heading marker 220 identifying the current heading (a heading of 161 degrees as shown). The desired aircraft direction is determined, for example, by the processor 104 using data from the navigation database 108, the sensors 112, and the external data sources 114. It will be appreciated, however, that the desired aircraft direction may be determined by one or more other systems or subsystems, and from data or signals supplied from any one of numerous other systems or subsystems within, or external to, the aircraft. Regardless of the particular manner in which the desired aircraft direction is determined, the processor 104 supplies appropriate display commands to cause the display device 116 to render the appropriate information. The compass 212 can be shown either in heading up, or track up mode with airplane symbol 218 representing the present lateral position (a selected course of 164). Additional information (not shown) is typically provided in either graphic or numerical format representative, for example, of glide slope, altimeter setting, and navigation receiver frequencies. In addition, and as will now be described in more detail, the display device 116, at least during an approach and/or landing mode of the aircraft, also selectively renders information representative of a flight path for intersecting the runway center line 214 or an instrument generated approach path.

In accordance with the first exemplary embodiment, the on-board processor 104 provides a pathway 226, visually depicted on the terrain 202, as a suggested flight path for the aircraft to intercept the instrument generated track, for example, extended runway centerline 214. Data processed by the processor 104 to determine the pathway 226 include current aircraft parameters of airspeed, altitude, the instrument generated track, and position relative to the target instrument generated track. Since the aircraft parameters are constantly changing, the processor 104 periodically, for example, every few seconds, processes the data and updates the pathway 226. The pathway 226 may be curved, straight, or include curved and straight sections.

Figure 3:
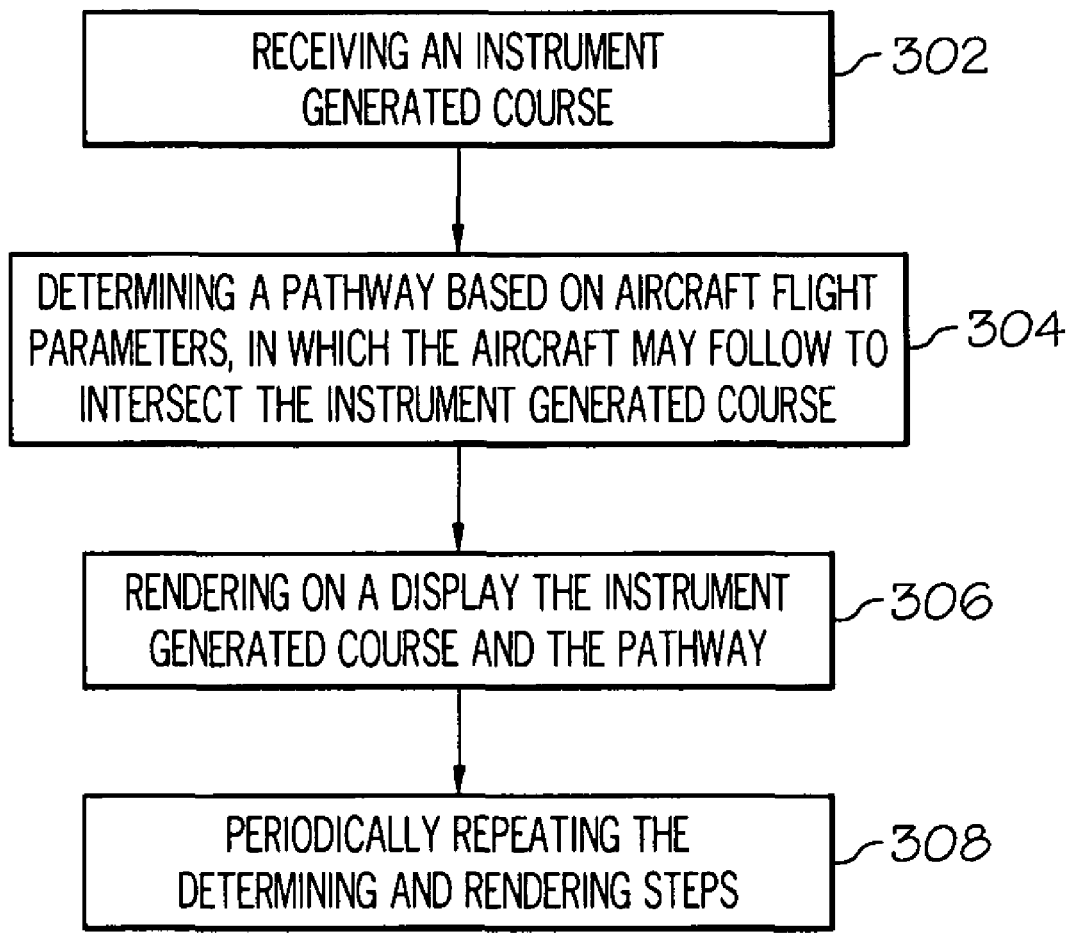
FIG. 3 is a flow chart of the first exemplary embodiment.

Referring to FIG. 3, the method of the first exemplary embodiment include receiving 302 an instrument generated course, determining 304 a pathway based on aircraft flight parameters, in which the aircraft may follow to intersect the instrument generated course, rendering 306 on a display the instrument generated course and the pathway, and periodically repeating 308 the determining and rendering steps.

In a second exemplary embodiment, the energy state of the aircraft may be considered. The energy state, in addition to airspeed and altitude, includes power setting, aircraft angle of attack, limitations on parameters (e.g., a minimum airspeed), and passenger comfort (e.g., a maximum bank/g forces). If any of these parameters reach a threshold, the pathway 226 may be coded as a caution to the pilot. For example, of the airspeed is too high, the pathway 226 may assume various shapes and colors depending on the amount the threshold has been exceeded and by how much. For example, the color of the pathway 226 may vary. For example, a green color may indicate a small variance, yellow may indicate a medium variance, and red may indicate a larger variance. These formats are beneficial because a variance of few degrees may not be otherwise noticeable. Additional icons or data boxes (not shown) may also be displayed to inform the pilot that the threshold has been reached or exceeded and by how much.

Additionally, the pathway 226 may be colored in sections. For example, while it may not be necessary to caution the pilot by making the pathway 226 red when the aircraft is twenty miles from the runway, a section of the pathway 226 closer to the runway may be color coded to caution the pilot to plan ahead. Even the runway or symbols used to highlight approach runway could appear as red, for example, if it is too short for the approach airspeed.

Figure 4:
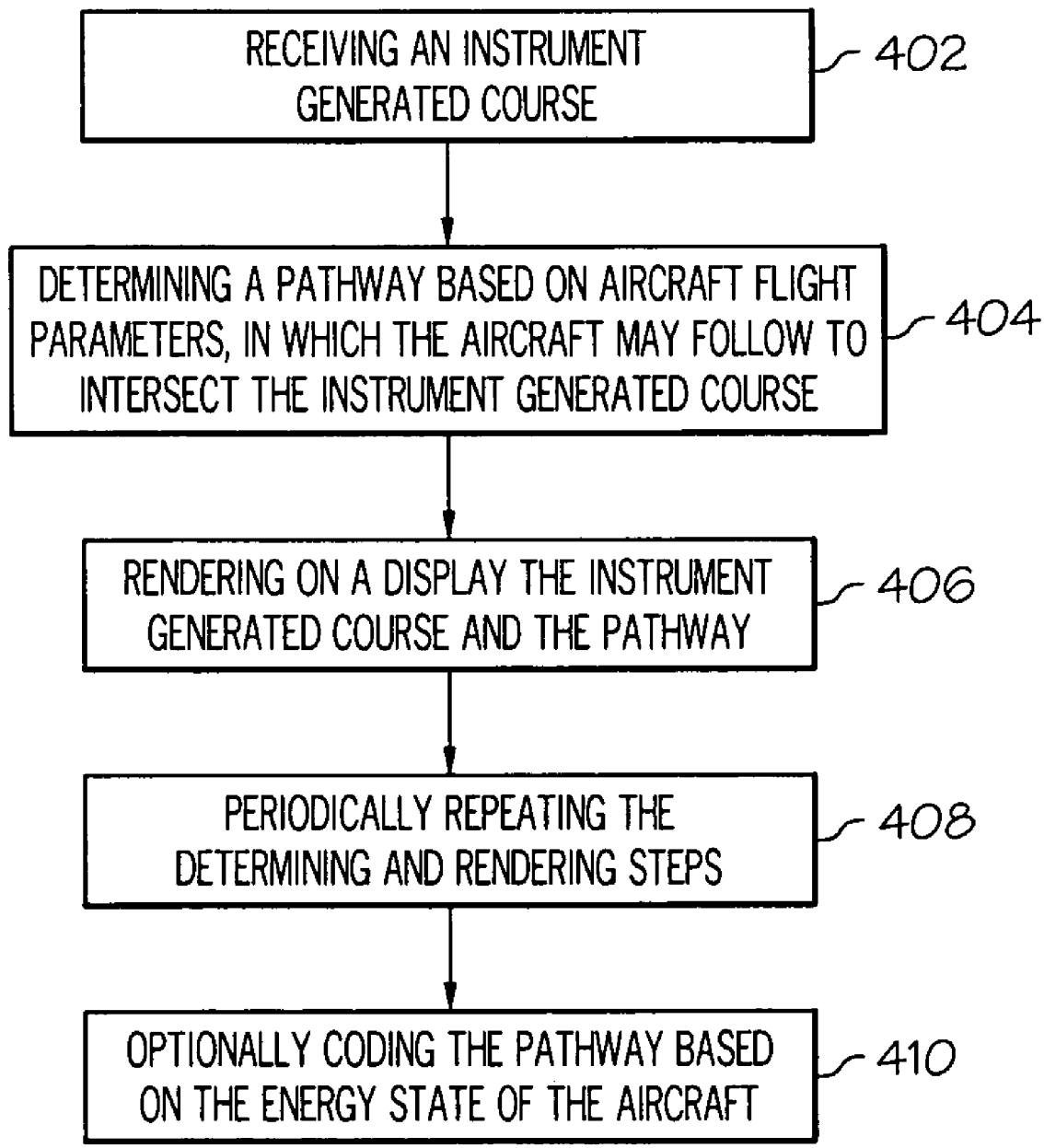
FIG. 4 is a flow chart of a second exemplary embodiment.

Referring to FIG. 4, the method of the second exemplary embodiment include receiving 402 an instrument generated course, determining 404 a pathway based on aircraft flight parameters, in which the aircraft may follow to intersect the instrument generated course, rendering 406 on a display the instrument generated course and the pathway, periodically repeating 408 the determining and rendering steps, and encoding the pathway based on the energy state of the aircraft. This encoding considers aircraft power setting, angle of attack, distance to the destination, current flight path angles, current acceleration or speed variations, and destination runway conditions such as length and weather conditions.

Figure 5:
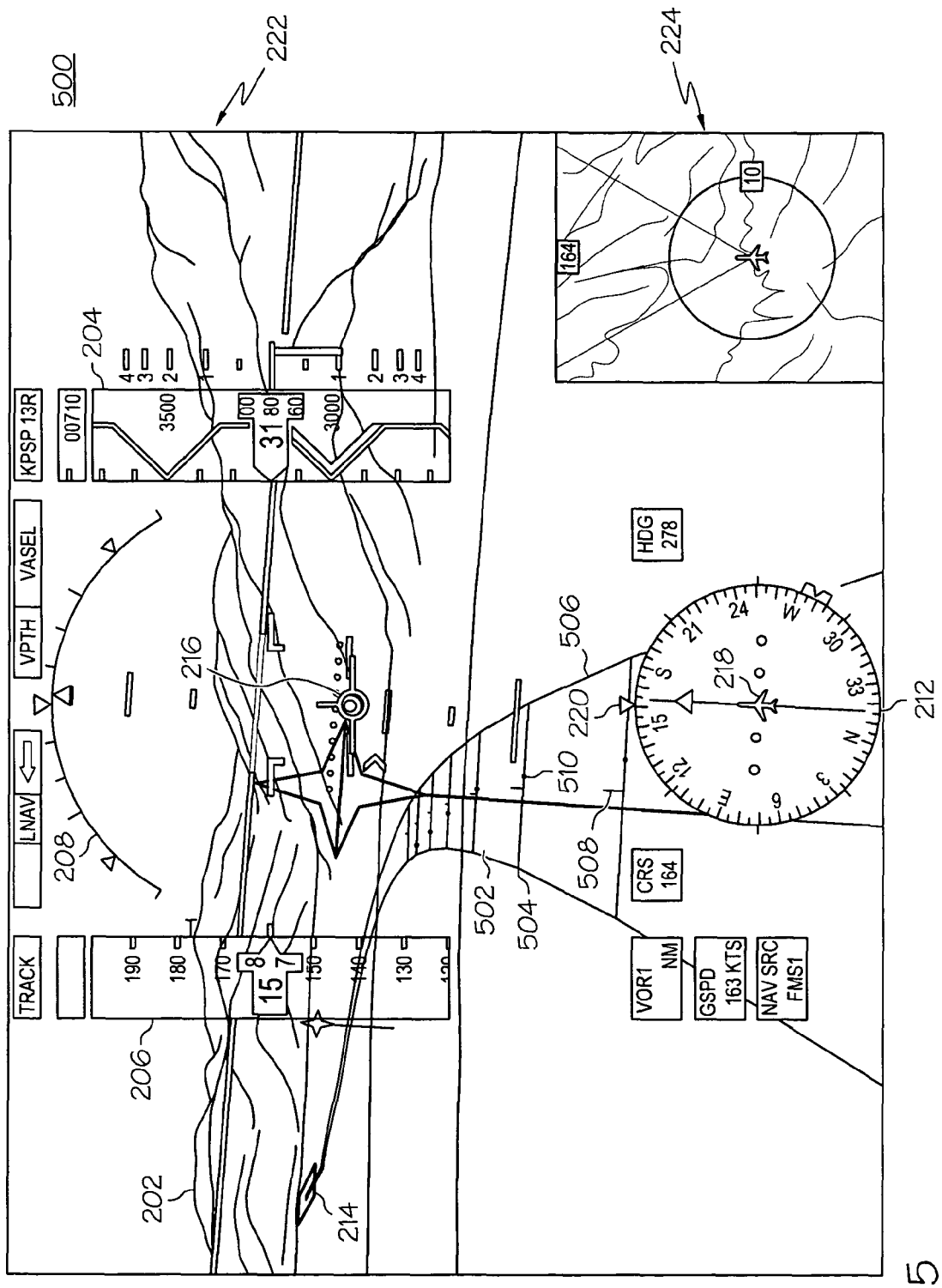
FIG. 5 is an image of a third exemplary embodiment that may be rendered on the flight display system of FIG. 1.

Referring to FIG. 5 and in accordance with a third exemplary embodiment, a pathway 502 generated by the processor 104 includes a left border 504 and a right border 506 illustrating a path in the sky in which the aircraft is suggested to maintain. The center of the pathway 502 is marked with indices 508, while the present course of the aircraft is indicated by dots 510. It may be seen that the current flight path of the aircraft, as illustrated by the dots 510, will position the aircraft near the left border 504 as the aircraft flies closer to the runway, indicating that the pilot will need to make a correction to the aircraft heading.

In a fourth exemplary embodiment, an aircraft trend deviation scale could optionally be provided to caution the pilot that the aircraft is deviating from the pathway 226. In normal displays, aircraft deviation from a pathway is measured by the current position to the pathway. It shows the deviation when the aircraft actually deviates from the pathway. When a trend deviation, for example the dots in FIG. 5, relative to the center line of the pathway is shown, immediate corrections may be applied before the aircraft actually deviates very far from the pathway.

Figure 6:
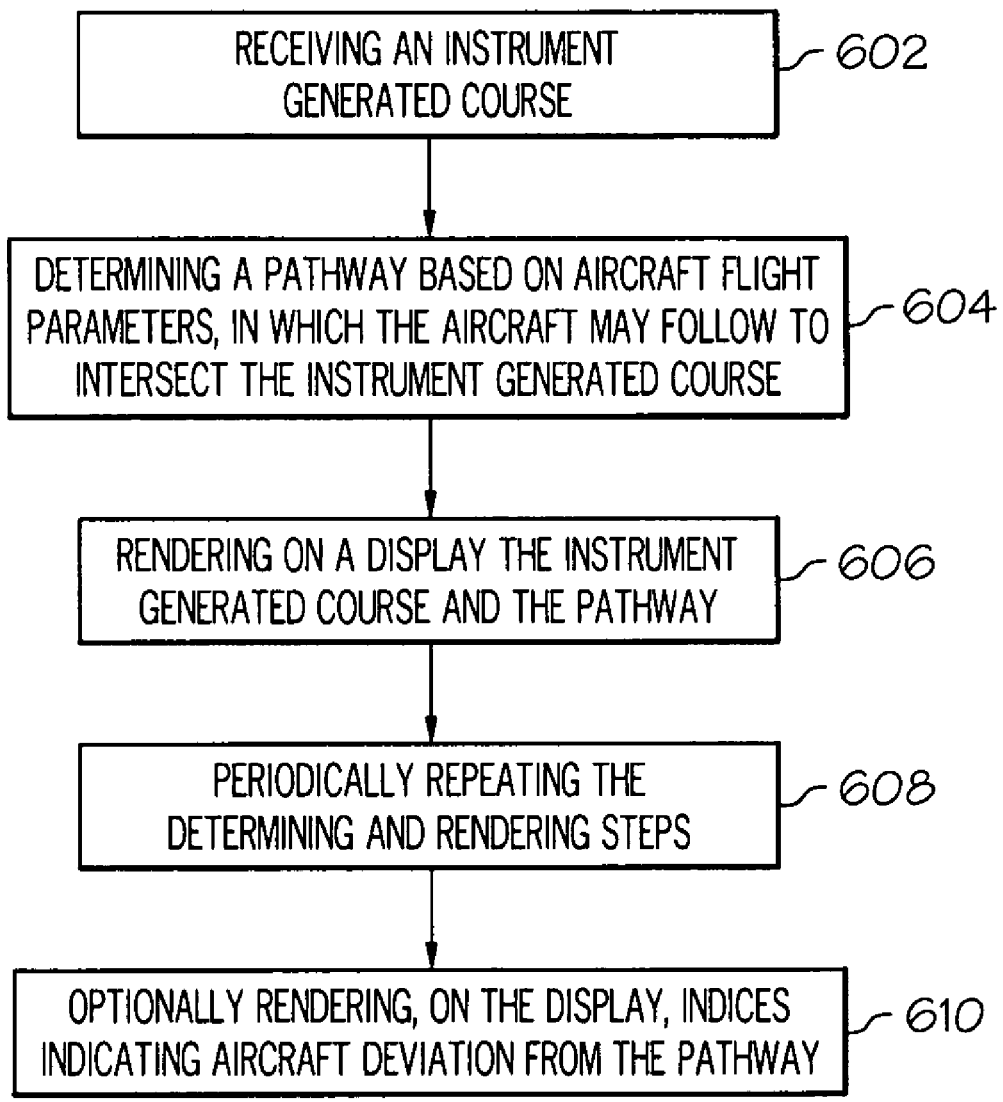
FIG. 6 is a flow chart of a fourth exemplary embodiment.

Referring to FIG. 6, the method of the fourth exemplary embodiment include receiving 602 an instrument generated course, determining 604 a pathway based on aircraft flight parameters, in which the aircraft may follow to intersect the instrument generated course, rendering 606 on a display the instrument generated course and the pathway, periodically repeating 608 the determining and rendering steps, and rendering 610 on the display indices indicating aircraft deviation from the pathway.

Figure 7:
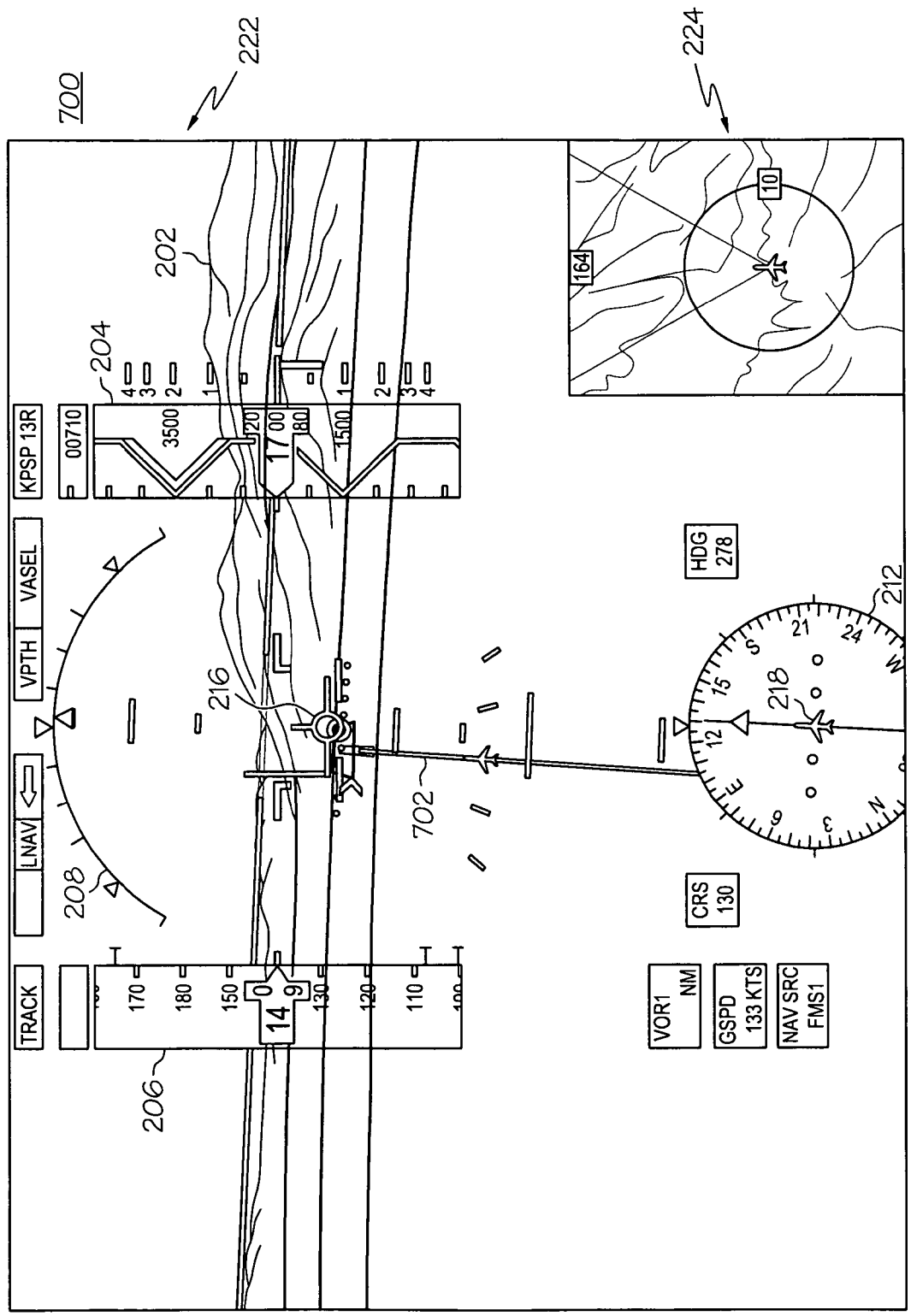
FIG. 7 is an image of a fifth exemplary embodiment that may be rendered on the flight display system of FIG. 1.

Referring to FIG. 7 and in accordance with a fifth exemplary embodiment, a ground course 702 is the target for the pathway (which is the same as the ground track in this case since the plane is on course) to be flown by the aircraft. The ground course 702 is displayed on the ground at the same elevation as the approach runway and is aligned with the approach direction to the runway. This course may generated by the ILS or an on-board FMS system.

A method has been described for displaying a pathway suggesting how an aircraft may be maneuvered to intersect a target ground course or an instrument generated course. The pathway determination is based on aircraft parameters and provides a safe and efficient route for the aircraft. In some embodiments, the energy state of the aircraft, and in some embodiments aircraft movement trends, are considered in determining the pathway.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method displaying a pathway for an aircraft, comprising:
   receiving an instrument generated course generally in alignment with a runway;
   determining the pathway, based on aircraft flight parameters, in which the aircraft may fly in order to intersect the instrument generated course, wherein the determining step includes considering aircraft airspeed, altitude, distance to the course, distance to a destination, distance to terrain, and maximum allowed deviation from the course;
   rendering on a display the instrument generated course and the pathway; and
   periodically repeating the determining and rendering steps.

2. The method of claim 1 further comprising coding the pathway based on the energy state of the aircraft.

3. The method of claim 2 wherein the coding step comprises coding based on aircraft power setting, angle of attack, distance to a destination, current flight path angles, current acceleration or speed variations, and destination runway conditions including length and weather conditions.

4. The method of claim 1 wherein the determining step is further based on passenger comfort.

5. The method of claim 1 wherein the determining step comprises changing the appearance of the runway.

6. The method of claim 1 further comprising providing indices indicating current aircraft deviation from the pathway.

7. The method of claim 6 wherein the determining step comprises:
   comparing the current aircraft deviation with a predicted aircraft deviation; and
   displaying the indices for deviations beyond a threshold.

8. A method of displaying a pathway for intercepting an instrument generated course by an aircraft, comprising:
   providing an instrument generated track;
   determining the pathway based on flight parameters of the aircraft, including:
     comparing the current aircraft deviation with a predicted aircraft deviation; and
     displaying the indices for deviations beyond a threshold;
   rendering on a display the instrument generated track and the pathway; and
   coding the pathway based on the energy state of the aircraft.

9. The method of claim 8 wherein the determining step includes considering aircraft airspeed and altitude.

10. The method of claim 8 wherein the determining step comprises defining a pathway to include lateral and vertical distance with respect to the terrain.

11. The method of claim 8 wherein the coding step comprises considering aircraft power setting and angle of attack.

12. The method of claim 8 further comprising providing indices indicating current aircraft deviation from the pathway.

13. A method of displaying a pathway for an aircraft, comprising:
   receiving an instrument generated course;
   determining the pathway based on aircraft flight parameters, including:
      comparing the current aircraft deviation with a predicted aircraft deviation; and
      displaying the indices for deviations beyond a threshold;
   determining aircraft deviation from the pathway; and
   rendering on a display the instrument generated course, the pathway, and indices indicating the aircraft deviation.

14. The method of claim 13 wherein the determining step includes considering aircraft airspeed and altitude.

15. The method of claim 13 wherein the determining step comprises defining a pathway to include lateral and vertical distance with respect to the terrain.

16. The method of claim 13 further comprising coding the pathway based on the energy state of the aircraft.

17. The method of claim 16 wherein the coding step comprises coding based on aircraft power setting and angle of attack.

* * * * *